United States Patent [19]

Lang

[11] Patent Number: 5,017,801
[45] Date of Patent: May 21, 1991

[54] METHOD AND APPARATUS FOR CONVERTING A GAP-INFESTED READ-IN CLOCK INTO A GAP-FREE READ-OUT CLOCK

[75] Inventor: Hermann Lang, Weilheim, Fed. Rep. of Germany

[73] Assignee: Siemens Aktiengesellschaft, Munich, Fed. Rep. of Germany

[21] Appl. No.: 476,714

[22] Filed: Feb. 8, 1990

[30] Foreign Application Priority Data

Mar. 23, 1989 [DE] Fed. Rep. of Germany ....... 3909678

[51] Int. Cl.$^5$ .......................... H03K 9/06; H03K 5/13
[52] U.S. Cl. ..................... 307/269; 307/262; 328/63; 328/72; 328/155; 331/25
[58] Field of Search ........... 307/269, 262, 271; 328/63, 72, 155; 331/1 A, 1 R, 25; 377/54, 46, 75, 76, 77, 78, 52

[56] References Cited

U.S. PATENT DOCUMENTS 4,066,978 1/1978 Cox, Jr. ............................ 331/1 A
4,820,994 4/1989 Sonntag et al. .................... 328/155
4,970,473 11/1990 Lietar ............................... 331/1 A

FOREIGN PATENT DOCUMENTS 0266588 5/1988 European Pat. Off. .

Primary Examiner—Timothy P. Callahan
Attorney, Agent, or Firm—Hill, Van Santen, Steadman & Simpson

[57] ABSTRACT

An integrated circuit wherein no disturbances due to spikes occur is provided for converting a gap-infested clock into a gap-free clock. In a phase-locked loop the frequency of a read-in clock is supplied to a phase discriminator via a frequency divider and the frequency of a read-out clock is supplied to the phase discriminator via another frequency divider. A succession of clocks shifted in phase relative to one another is provided by a generator from an auxiliary frequency of a crystal oscillator which feeds an auxiliary successor sequence clock generator which provides a plurality of successor auxiliary clocks. Which of these clocks provides the read-out clock after a division in a frequency divider is defined by a switching frequency output by a frequency divider which is controlled by the phase discriminator.

5 Claims, 3 Drawing Sheets

METHOD AND APPARATUS FOR CONVERTING A GAP-INFESTED READ-IN CLOCK INTO A GAP-FREE READ-OUT CLOCK

BACKGROUND OF THE INVENTION

1. Field of the Invention

The present invention relates to a method for converting a gap-infested read-in clock into a gap-free read-out clock having the same number of pulses on the basis of phase-shift control (PLL) and is also directed to an arrangement for implementation of the method.

2. Description of the Prior Art

Such an arrangement is utilized in the receiving path of digital multiplexer systems since the clock of the respective sub-channel is required for the recovery of the sub-channel. It is disclosed in European Patent application No. 0 266 588 A1. In this arrangement, however, realization in an integrated circuit and, in particular, the circuit simulation, presents difficulties due to the appearance of spikes.

SUMMARY OF THE INVENTION

It is an object of the invention to provide a method of the type set forth above that is performed by an apparatus which is suitable for realization as an integrated circuit.

The above object is achieved, according to the present invention, by generating a gap-free internal clock having a multiple of the frequency of the read-out clock, generating the read-out clock while dividing the frequency of the internal clock, dividing the frequency of the read-in clock, identically dividing the frequency of the read-out clock, comparing the logical states of the divided read-in clock and the divided read-out clock, generating control pulses during time intervals of identified inequality, generating an auxiliary clock, summing the pulses of the auxiliary clock during the respective appearance of the control pulses, generating switching pulses upon respective attainment of a defined final sum, and generating an auxiliary clock, and is particularly characterized in that a sequence of n successor auxiliary clocks (FH1-FHn) and n inverted successor auxiliary clocks (FH1-FHn) is derived from the auxiliary clock, these having identical phase spacings at an identical frequency and a pulse-duty ratio of 1:1 such the sum of the phase spacings corresponds to a period of the auxiliary clock (FH), in that an n-fold switching pulse frequency (nFH) is generated, in that one of the successor auxiliary clocks (FHx) is connected through as the internal clock (FI), and in that, at the appearance of each switching pulse (nFX), a successor auxiliary clock (FHx+1) following with its phase spacing is through-connected instead of the successor auxiliary clock (FHx) that was previously through-connected, being thus through-connected as soon as the said following successor auxiliary clock has the same logical state as that successor auxiliary clock (FHx) that was previously through-connected.

According to the invention, the method is achieved in that a phase discriminator is provided, a first frequency divider includes an input which serves as an input for the read-in clock and an output which is connected to a first input of the phase discriminator, a summing counter for a mean value formation includes a control input which is connected to the output of the phase discriminator, a generator is provided for internal clock and has a control input which is connected to the output of the summing counter and an output connected to the input of the summing counter, a second frequency divider is provided whose input is connected to the output of the generator and whose output serves as an output for the read-out clock, a third frequency divider is provided whose input is connected to the output of the second frequency divider and whose output is connected to the second input of the phase discriminator, and a crystal oscillator provides an auxiliary clock. The arrangement is particularly characterized in that the summing counter generates an n-fold switching pulse frequency, and in that an auxiliary clock sequence generating device for deriving the n successor-auxiliary clocks and the n inverted successor auxiliary clocks whose input is connected to the crystal oscillator, a first D flip-flop includes a clock input connected to the control input, a shift register ring includes a clock input which is connected to the Q output of the D flip-flop and a switchover device is controlled by the shift register ring, these elements being provided in the generator for the internal clock and these respectively connecting one of the outputs of the auxiliary clock sequence generating means to the output of the generator of the internal clock.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
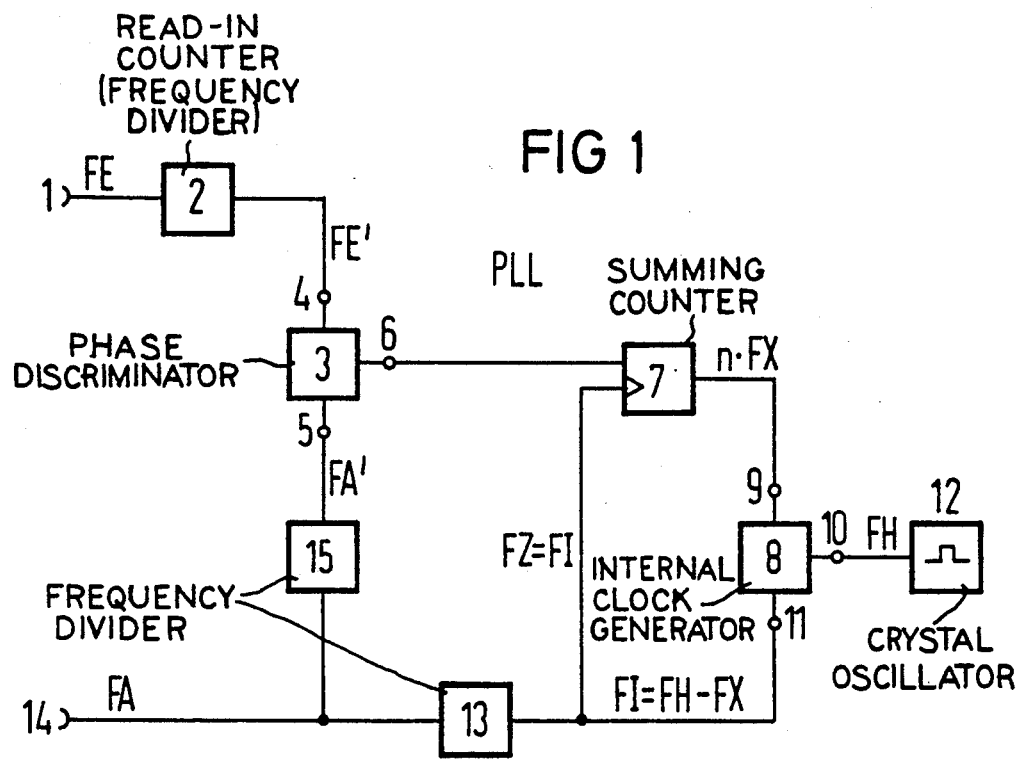
FIG. 1 is a schematic block diagram of an arrangement constructed in accordance with the invention.

Referring to FIG. 1, the arrangement contains frequency dividers or, respectively, read-in counters 2, a phase discriminator 3, a frequency counter 7, a generator 8, a crystal oscillator 12, a frequency divider 13 and a frequency divider or, respectively, read-out counter 15. The frequency FE of the read-in clock at a clock input 1 is divided into a frequency divider 2 and the frequency FA of the read-out clock at a clock output 14 is divided in the frequency divider 15 and supplied to the phase discriminator 3 that can be composed of an EXCLUSIVE OR gate. The pulse duty ratio of the phase discriminator 3 controls the frequency divider 7 by way of its output 6. Whenever the frequency divider 7 overflows with a frequency nFX, the output signal of the generator 8 derive from the crystal oscillator 12 is forwarded by one phase at a terminal 11. The internal frequency FI=FH−FX resulting therefrom is now lowered in comparison to the auxiliary frequency FH of the crystal oscillator 12 to such an extent that, for example, it yields a read-out clock having a frequency FA=2048 kHz after a division by sixteen in the frequency divider 13 or yields a frequency FA=8448 kHz after a division by four.

Figure 2:
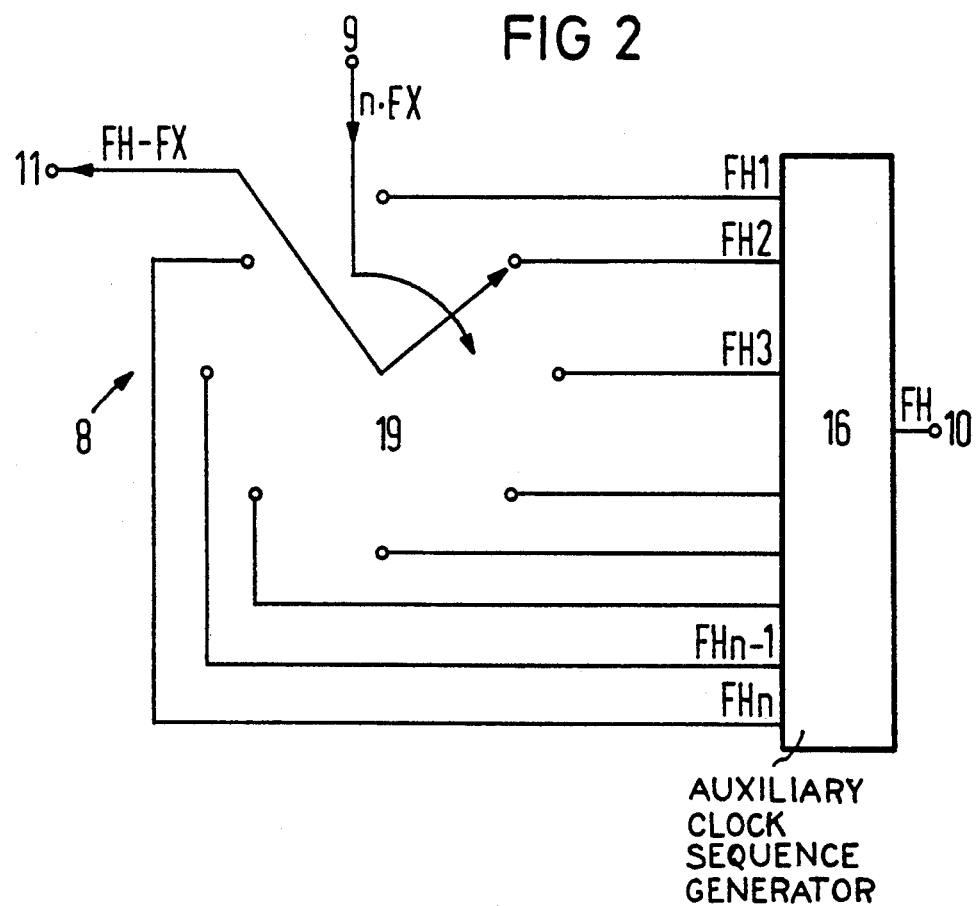
FIG. 2 is a basic circuit diagram of a generator for the internal clock.

FIG. 2 illustrates a block circuit diagram of the generator 8. It contains an auxiliary clock sequence generating device 16 for deriving the successor auxiliary clocks FH1 through FHn and FH1 through FHn from the auxiliary clock FH and contains a switchover device 19.

The internal frequency FI=FH−FX occurs at the output 11 by regular switching of the switchover device 19 with the frequency nFX.

Figure 3:
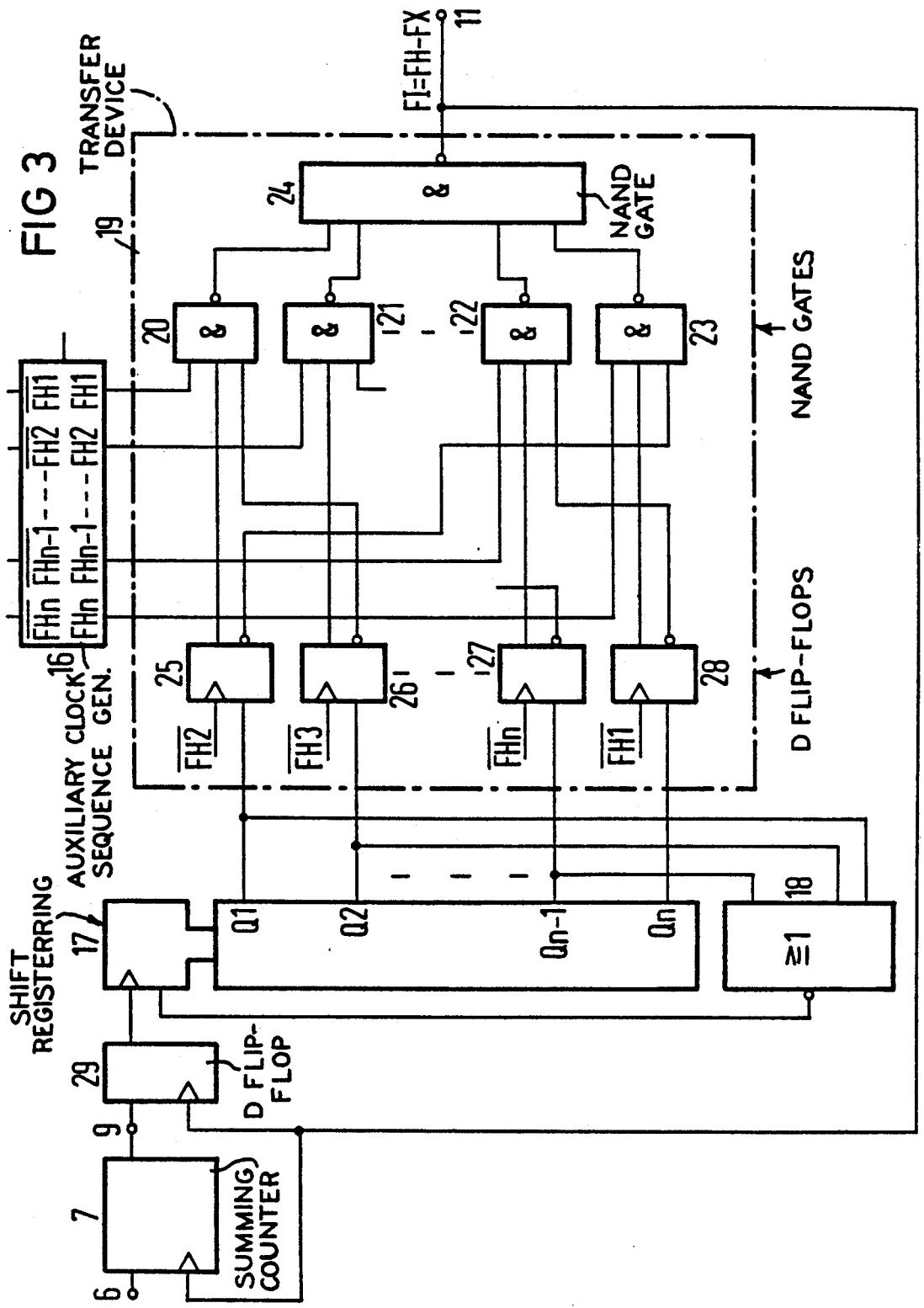
FIG. 3 is a detailed logic diagram of the generator for the internal clock.

FIG. 3 shows a practical realization of the generator 8 of FIG. 2 in addition to showing the summing counter 7. The generator 8 contains the auxiliary clock sequence generating device 16, an n-stage shift register 17, a NOR gate 18, a switch-over device 19 having NAND gates 20-24 and having D flip-flops 25-28 as well as a further D flip-flop 29.

The shift register 17 and the NOR gate 18 form a shift register ring because the NOR gate 18 outputs a logical state of "H" only when, except for the last output, all outputs Q1-Qn of the shift register 17 have a logical state "L", so that it is always only precisely one output that has a logical state of "H".

The auxiliary frequency deriving from the crystal generator 12 is somewhat higher than the n-fold frequency FA of the output clock. This is edited in the auxiliary clock sequence generating device 16 such that it forms n-successor auxiliary clocks FH1-FHn and FH1-FHn having a pulse duty ratio of 1:1 that are respectively shifted by 360°/n relative to one another in ascending sequence (n>2).

The actual switching from one successor auxiliary clock to the next, i.e. the activation of a new path to the output 11 and the disconnection of the previous path from the output 11, is triggered by the trailing edge of the next, inverted successor auxiliary clock in one of the D flip-flops 25-28 and occurs when the two participating NAND gates 20-23 have the same logical state.

Logic circuits having AND, NOR or OR gates can replace the AND gates 20-24.

Given an allowable overall tolerance $\pm \Delta FA$ of the frequency FE or, respectively, FA, the following holds true for the frequency FH:

$$FH = N_{13}(FA + \Delta FA),$$

where $N_{13}$ is the division factor of the frequency divider 13.

Figure 4:
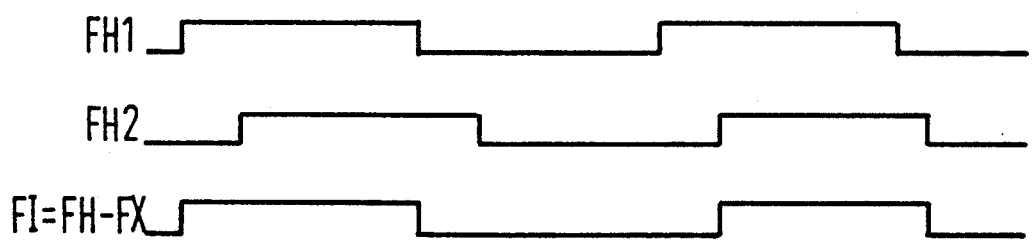
FIG. 4 is a graphic representation of a pulse plan for switching.

By switching with the switching frequency nFX from one successor auxiliary clock to the next, the phase thereof being shifted by 360°/n in comparison to the preceding clock, a period length at the output 11 is lengthened from 360° to 360°+360°/n with reference to the frequency FH during the respective switching event, so that the resulting frequency has a mean value of FH−FX (FIG. 4). The phase error 360°/n of the resulting frequency is reduced to the value 360°/(n×$N_{13}$) in the following frequency divider 13. The frequency FA=(FH−FX)/$N_{13}$ thus holds true for the frequency FA. The frequency FX=FH−$N_{13}$×FA×T can fluctuate between 0 and a maximum of $N_{13}$×2×$\Delta$FA within the pull range of the phase locked loop. The precise value is defined by the pulse duty ratio T of the voltage at the output 6 of the phase discriminator 3. The switching from one successor auxiliary clock to the next always occurs when the frequency divider 7 that is clocked with the resulting frequency FI=FH and is enabled by the phase discriminator 3 via the enable input overflows and switches at the output 9 from the logic state "L" to the logic state "H". The switchover device 19 is forwarded by one step respectively after the clocking with the leading edge of the resulting frequency FI in the D flip-flop 29 via the shift register 17.

The capture zero-in range occurs at $$2\Delta FA = FA/(n \times N_7),$$

where $N_7$ is the division factor of the frequency divider 7. Accordingly, the auxiliary frequency FH amounts to $$FH = FA \times N_{13} \times [1 + 1/(2 \times n \times N_7)].$$

The following tables illustrate practical values of an exemplary embodiment of the invention that, given switching of the division factors $N_7$ and $N_{13}$, is suitable for frequencies FA and FE of either 2048 kHz or 8448 kHz.

| FA = FE | 2048 kHz | 8448 kHz |
|---|---|---|
| n | 8 | 8 |
| $N_{13}$ | 16 | 4 |
| $N_7$ | 384 | 512 |
| $\frac{2\Delta FA}{FA}$ | 325.5 ppm | 244.1 ppm |
| FX max | 10.65 kHz | 8.25 kHz |
| FH | 33.77333 MHz | 33.7961 MHz |
| $N_2 = N_{15}$ | 32 | 32 |
| Self-jitter amplitude | 0.008 UI | 0.032 UI |
| Self-jitter frequency | 43 kHz | 33 kHz on average |
| Limit frequency of the jitter transmission | 7 Hz | 21 Hz |

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a method for converting a gap-free infested read-in clock into a gap-free read-out clock having the same number of pulses on the basis of a phase locked loop shift control, the method comprising the steps of generating a gap-free internal clock having a frequency which is a multiple of the read-out clock, generating the read-out clock while dividing the frequency of the internal clock by a first predetermined factor, dividing the frequency of the read-in clock by a second predetermined factor, identically dividing the frequency of the read-out clock by the second predetermined factor, comparing the logical states of the divided read-in and read-out clocks and generating control pulses during time intervals of identified inequalities, generating an auxiliary clock, summing the pulses of the auxiliary clock during the respective appearances of the control pulses, generating switching pulses upon each attainment of a predetermined final sum of the auxiliary clock pulses, the improvement therein comprising the steps of:

deriving a sequence of n successor auxiliary clocks from the auxiliary clock having identical phase spacings and a pulse duty factor of 1:1 such that the sum of the phase spacings corresponds to a period of the auxiliary clock;

generating an n-fold switching pulse frequency;

connecting through one of the successor auxiliary clocks as an internal clock;

upon the appearance of each switching pulse, connecting through the successor auxiliary clock with its phase spacing following that connected-through successor auxiliary clock as an internal clock as soon as the logical state of the following successor auxiliary clock is equal to that of the previously through-connected successor auxiliary clock.

2. The improved method of claim 1, and further comprising the step of:

inhibiting all successor auxiliary clocks which are not through-connected as an internal clock.

3. The improved method of claim 1, and further comprising the step of:

selecting one of the successor auxiliary clocks and the internal clock to serve as an additional clock.

4. An arrangement for converting a gap-infested read-in clock into a gap-free read-out clock having the same number of pulses, comprising:

a first frequency divider including an input for receiving a read-in clock and an output;

a phase discriminator including a first input connected to said output of said first frequency divider, a second input and an output;

a summing counter for mean value formation including a first input connected to said output of said phase discriminator, a second input, and an output;

a crystal oscillator including an output;

an internal clock generator including a first input connected to said output of said crystal oscillator, a second input connected to said output of said summing counter, and an output connected to said second input of said summing counter;

a second frequency divider including an input connected to said output of said internal clock generator and an output serving as the output for the read-out clock; and a third frequency divider including an input connected to said output of said second frequency divider and an output connected to said second input of said phase discriminator, said summing counter producing an n-fold switching pulse frequency, said internal clock generator comprising an auxiliary clock sequence generator including an input connected to said crystal oscillator and a plurality of outputs and operable to produce n successor auxiliary clocks and n inverted successor auxiliary clocks at respective ones of said outputs, a first D flip-flop including a first input as a clock input connected to said output of said summing counter, a second input connected to said output of said internal clock generator, and an output connected to said second input of said summing counter, and a Q output, a shift register ring including an input as a clock input connected to said Q output of said first D flip-flop, and a plurality of outputs, and a transfer device connected to and controlled by said outputs of said shift register ring to selectively connect said outputs of said auxiliary clock sequence generator to said output of said internal clock generator.

5. The apparatus of claim 4, wherein said transfer device comprises:

n ordered D flip-flops assigned order numbers 1 through n and each including a D input connected to a respective output of said shift register ring, said outputs of said shift register ring being ordered with the same numbering, a clock input connected to a respective output of said auxiliary clock sequence generator for the inverted successor auxiliary clocks which are provided with the same ordering numbers, cyclically mixed, a Q output and a $\overline{Q}$ output;

n NAND gates assigned the same ordering and each including a first input connected to a respective output of said auxiliary clock sequence generator for the non-inverted successor auxiliary clocks which also have the same ordering, cyclically mixed, a second input connected to said Q output of a respective ordered D Flip-flop which has the same ordering number, a third input connected to the $\overline{Q}$ output of another respective ordered D flip-flop, and an output; and a further NAND gate including a plurality of inputs each connected to said output of a respective one of said n NAND gates, and an output for providing said internal clock.

* * * * *